(12) United States Patent
Youn et al.

(10) Patent No.: US 11,942,629 B2
(45) Date of Patent: Mar. 26, 2024

(54) LITHIUM ELECTRODE AND LITHIUM SECONDARY BATTERY COMPRISING SAME

(71) Applicant: LG CHEM, LTD., Seoul (KR)

(72) Inventors: Suk Il Youn, Daejeon (KR); Byoungkuk Son, Daejeon (KR); Junghun Choi, Daejeon (KR); Minchul Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 725 days.

(21) Appl. No.: 17/040,244

(22) PCT Filed: Jan. 10, 2020

(86) PCT No.: PCT/KR2020/000527
§ 371 (c)(1),
(2) Date: Sep. 22, 2020

(87) PCT Pub. No.: WO2020/145753
PCT Pub. Date: Jul. 16, 2020

(65) Prior Publication Data
US 2021/0020927 A1     Jan. 21, 2021

(30) Foreign Application Priority Data

Jan. 11, 2019   (KR) .................. 10-2019-0003695

(51) Int. Cl.
*H01M 4/00* (2006.01)
*H01M 4/36* (2006.01)
(Continued)

(52) U.S. Cl.
CPC ........... *H01M 4/382* (2013.01); *H01M 4/366* (2013.01); *H01M 4/604* (2013.01); *H01M 4/62* (2013.01);
(Continued)

(58) Field of Classification Search
CPC .. H01M 4/382; H01M 4/604; H01M 10/0525; H01M 50/46; H01M 2004/027;
(Continued)

(56) References Cited

U.S. PATENT DOCUMENTS 6,214,061 B1   4/2001   Visco et al.
6,911,280 B1   6/2005   De Jonghe et al.
(Continued)

FOREIGN PATENT DOCUMENTS

CN        103560164 A    2/2014
CN        104617328 A    5/2015
(Continued)

OTHER PUBLICATIONS

Extended European Search Report for European Application No. 20738747.3, dated Apr. 20, 2021.
(Continued)

*Primary Examiner* — Nicholas P D'Aniello
(74) *Attorney, Agent, or Firm* — Birch, Stewart, Kolasch & Birch, LLP

(57) ABSTRACT

A lithium electrode having an acrylic polymer layer formed on a lithium metal layer wherein the acrylic polymer layer functions as a protective layer for the lithium metal layer, and functions as a release layer in the manufacturing process of the lithium electrode. The acrylic polymer layer shows an effect that does not act as a resistance in the lithium secondary battery comprising the lithium electrode during operation of the battery.

8 Claims, 1 Drawing Sheet

(51) Int. Cl.
  H01M 4/38 (2006.01)
  H01M 4/60 (2006.01)
  H01M 4/62 (2006.01)
  H01M 10/0525 (2010.01)
  H01M 50/46 (2021.01)
  H01M 4/02 (2006.01)
  H01M 10/052 (2010.01)

(52) U.S. Cl.
  CPC ....... *H01M 10/0525* (2013.01); *H01M 50/46* (2021.01); *H01M 2004/027* (2013.01); *H01M 2004/028* (2013.01); *H01M 10/052* (2013.01); *H01M 2300/0051* (2013.01)

(58) Field of Classification Search
  CPC ... H01M 2004/028; H01M 2300/0051; H01M 10/052; H01M 4/366; H01M 4/134; H01M 4/1395; H01M 4/62; H01M 10/4235; H01M 4/0402; H01M 10/0569; H01M 2300/0028; Y02E 60/10
  See application file for complete search history.

(56) References Cited

U.S. PATENT DOCUMENTS

| | | |
|---|---|---|
| 2004/0241549 A1 | 12/2004 | Cho et al. |
| 2005/0008938 A1 | 1/2005 | Cho et al. |
| 2005/0079420 A1 | 4/2005 | Cho et al. |
| 2005/0095504 A1 | 5/2005 | Kim et al. |
| 2009/0061321 A1* | 3/2009 | Yakovleva ............ H01M 4/134 429/231.95 |
| 2009/0191464 A1 | 7/2009 | Ryu et al. |
| 2010/0086851 A1 | 4/2010 | Wang et al. |
| 2010/0221611 A1 | 9/2010 | Menke et al. |
| 2013/0236766 A1 | 9/2013 | Seo et al. |
| 2014/0272565 A1 | 9/2014 | Gronwald et al. |
| 2016/0149212 A1 | 5/2016 | Zaghib et al. |
| 2016/0204476 A1 | 7/2016 | Kobayashi |
| 2016/0293943 A1* | 10/2016 | Hu ..................... H01M 10/052 |
| 2016/0380314 A1 | 12/2016 | Yang et al. |
| 2017/0015805 A1 | 1/2017 | Kryger et al. |
| 2017/0062829 A1 | 3/2017 | Ryu et al. |
| 2017/0317352 A1 | 11/2017 | Lee et al. |
| 2017/0324097 A1 | 11/2017 | Lee et al. |
| 2018/0051137 A1 | 2/2018 | Kim et al. |
| 2018/0053978 A1 | 2/2018 | Song et al. |
| 2018/0318051 A1 | 11/2018 | Lee et al. |
| 2019/0081346 A1 | 3/2019 | Yun et al. |
| 2020/0075939 A1 | 3/2020 | Son et al. |

FOREIGN PATENT DOCUMENTS

| | | |
|---|---|---|
| CN | 103560162 B | 2/2017 |
| CN | 108807851 A | 11/2018 |
| EP | 3 109 924 A1 | 12/2016 |
| EP | 3 244 471 A1 | 11/2017 |
| JP | 2000-315504 A | 11/2000 |
| JP | 2001-313025 A | 11/2001 |
| JP | 2003-109574 A | 4/2003 |
| JP | 2005-142156 A | 6/2005 |
| JP | 2013-20974 A | 1/2013 |
| JP | 5269692 B2 | 8/2013 |
| JP | 2014-503951 A | 2/2014 |
| JP | 2014-205731 A | 10/2014 |
| JP | 2015-46220 A | 3/2015 |
| JP | 6005938 B2 | 10/2016 |
| JP | 6087647 B2 | 3/2017 |
| JP | 2017-204468 A | 11/2017 |
| JP | 2018-46005 A | 3/2018 |
| JP | 2018-520250 A | 7/2018 |
| KR | 10-2005-0019483 A | 3/2005 |
| KR | 10-0497231 B1 | 6/2005 |
| KR | 10-0515301 B1 | 9/2005 |
| KR | 10-0635684 B1 | 10/2006 |
| KR | 10-2009-0083710 A | 8/2009 |
| KR | 10-2011-0017214 A | 2/2011 |
| KR | 10-2012-0046091 A | 5/2012 |
| KR | 10-2015-0041350 A | 4/2015 |
| KR | 10-2015-0101808 A | 9/2015 |
| KR | 10-2015-0132427 A | 11/2015 |
| KR | 10-2015-0145046 A | 12/2015 |
| KR | 10-2016-0032245 A | 3/2016 |
| KR | 10-2016-0033608 A | 3/2016 |
| KR | 10-2016-0037488 A | 4/2016 |
| KR | 10-2016-0037610 A | 4/2016 |
| KR | 10-2016-0052351 A | 5/2016 |
| KR | 10-2017-0001069 A | 1/2017 |
| KR | 10-2017-0017125 A | 2/2017 |
| KR | 10-2017-0026098 A | 3/2017 |
| KR | 10-2017-0036481 A | 4/2017 |
| KR | 10-1738769 B1 | 5/2017 |
| KR | 10-2017-0086002 A | 7/2017 |
| KR | 10-2017-0123957 A | 11/2017 |
| KR | 10-2017-0124075 A | 11/2017 |
| KR | 10-2018-0032000 A | 3/2018 |
| KR | 10-2018-0035168 A | 4/2018 |
| KR | 10-2018-0119254 A | 11/2018 |
| KR | 10-1926917 B1 | 12/2018 |
| WO | WO 99/57770 A1 | 11/1999 |
| WO | WO 01/39294 A2 | 5/2001 |
| WO | WO 2017/104867 A1 | 6/2017 |

OTHER PUBLICATIONS

International Search Report (PCT/ISA/210) issued in PCT/KR2020/000527, dated Apr. 28, 2020.

* cited by examiner

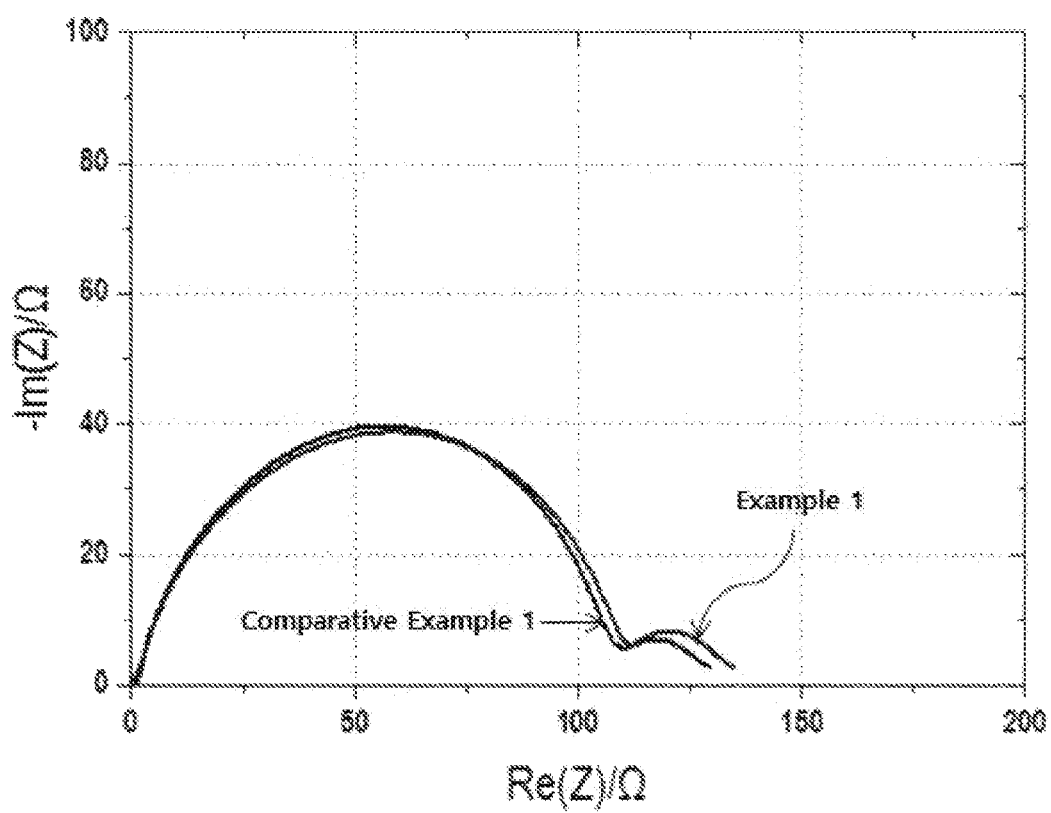

LITHIUM ELECTRODE AND LITHIUM SECONDARY BATTERY COMPRISING SAME

TECHNICAL FIELD

This application claims the benefit of priority based on Korean Patent Application No. 10-2019-0003695, filed on Jan. 11, 2019, all contents of which are incorporated herein by reference.

One aspect of the present disclosure relates to a lithium electrode that may improve the performance and lifetime characteristics of a lithium secondary battery, and a lithium secondary battery comprising the same.

BACKGROUND ART

Until a recent date, there has been considerable interest in developing batteries with high energy densities using lithium as a negative electrode. For example, as compared to other electrochemical systems with a lithium inserted carbon negative electrode and a nickel or cadmium electrode that reduce the energy density of the battery by increasing the weight and volume of the negative electrode due to the presence of the non-electroactive material, since lithium metal has low weight and high performance characteristics, lithium metal has attracted much attention as a negative electrode active material for electrochemical batteries. Lithium metal negative electrode, or negative electrodes, which mainly comprise lithium metal, provides the opportunity to construct a battery that is lighter and has a higher energy density than the battery such as a lithium-ion, nickel metal hydride or nickel-cadmium battery. These features are highly desirable for batteries for portable electronic devices, such as cell phones and lap-top computers, where premiums are paid with low weighted value.

Conventional lithium ion batteries have an energy density of 700 wh/l by using graphite as a negative electrode and using lithium cobalt oxide (LCO) as a positive electrode. However, in recent years, the fields requiring high energy density are expanding, and thus there is a continuing need to increase the energy density of a lithium ion battery. For example, even in order to increase the mileage of an electric car by a single charge to more than 500 km, an increase in energy density is required.

In order to increase the energy density of the lithium ion battery, the use of lithium electrode is increasing. However, there is a problem that lithium metal is difficult to handle in process because it is highly reactive and difficult to handle.

Thus, in order to solve these problems, various attempts have been made to manufacture electrodes using lithium metal.

Korean Patent No. 1738769 forms a polymer film on the surface of a lithium metal electrode, wherein the polymer membrane includes at least one of a copolymer of a hydrophobic polymer and an ion conductive polymer and a mixture of a hydrophobic polymer and an ion conductive polymer, so that the lithium metal layer can be efficiently protected from moisture. However, if the lithium metal electrode is assembled as a component of the battery, there is a problem that the polymer film formed on the surface of the lithium metal electrode acts as a resistance, thereby degrading the lifetime and performance of the battery.

Therefore, there is a continuing need for technology development for the development of a protective layer that can protect lithium metal from moisture or external air in a lithium metal electrode and also does not reduce the performance and lifetime of the battery.

PRIOR ART DOCUMENT

Patent Document

Korean Patent No. 1738769
Korean Patent Application Publication No. 2017-0017125

DISCLOSURE

Technical Problem

As a result of various studies to solve the above problems, the inventors of the present invention have manufactured a lithium electrode comprising a lithium metal layer and an acrylic polymer layer by a transfer process using an acrylic release film comprising the acrylic polymer layer. The inventors of the present invention have confirmed that the acrylic polymer layer functions as a release layer in the transfer process when manufacturing a lithium electrode, functions as a protective layer for lithium metal in the manufactured lithium electrode, and is dissolved in an electrolyte solution and thus does not act as a resistance when operating the battery to which the lithium electrode is applied.

Accordingly, it is an object of the present invention to provide a lithium electrode comprising a protective layer for lithium metal and an acrylic polymer layer that functions as a release layer for the transfer process, and a manufacturing method thereof.

In addition, it is another object of the present invention to provide a lithium secondary battery comprising the lithium electrode as described above.

Technical Solution

In order to achieve the above objects, the present invention provides a lithium electrode comprising a lithium metal layer; and an acrylic polymer layer formed on at least one surface of the lithium metal layer.

The acrylic polymer layer may comprise an acrylic polymer and an acidic releasing agent.

The acrylic polymer layer may comprise an acrylic polymer in an amount of 99.9% by weight to 99.99% by weight and an acidic releasing agent in an amount of 0.01% by weight to 0.1% by weight.

The acrylic polymer may comprise at least one repeating unit selected from the group consisting of an acrylate-based repeating unit and a methacrylate-based repeating unit.

The acrylic polymer may further comprise at least one repeating unit selected from the group consisting of an aromatic vinyl-based repeating unit; an imide-based repeating unit; a vinyl cyanide-based repeating unit; and a 3 to 6 membered heterocyclic repeating unit substituted with at least one carbonyl group.

The acidic releasing agent may be at least one selected from the group consisting of fatty acid, stearic acid, palmitic acid and oleic acid.

The present invention also provides a method for manufacturing a lithium electrode comprising the steps of (S1) forming a lithium metal layer on an acrylic release film, wherein the acrylic release film comprises a substrate layer; (S2) transferring the lithium metal layer formed on the acrylic release film to a current collector; and (S3) removing the substrate layer present in the acrylic release film.

The acrylic release film may include a substrate layer; and an acrylic polymer layer formed on at least one surface of the substrate layer.

The substrate layer may comprise at least one selected from the group consisting of polyethylene terephthalate (PET), polyimide (PI), poly(methylmethacrylate) (PMMA), cellulose triacetate (TAC), polypropylene (PP), polyethylene (PE), and polycarbonate (PC).

In step (S1), the lithium metal layer may be formed by depositing lithium on the acrylic release film.

The present invention also provides a lithium secondary battery comprising the lithium electrode.

The lithium secondary battery may comprise a positive electrode, a negative electrode, a separator interposed between the positive electrode and the negative electrode, and an electrolyte solution.

The electrolyte solution may be a carbonate-based electrolyte solution.

Advantageous Effects

According to one aspect of the present disclosure, an acrylic polymer layer is formed on at least one surface of the lithium metal layer in the lithium electrode, and the acrylic polymer layer functions as a protective layer for lithium metal.

In addition, the acrylic polymer layer may function as a release layer when removing the substrate comprised in the acrylic release film after the transfer process in the manufacturing method of the lithium electrode.

In addition, the acrylic polymer layer is dissolved in the electrolyte solution comprised in the lithium secondary battery and thus does not act as a resistance during operation of the battery. In the case where the electrolyte solution is a carbonate-based electrolyte solution, the acrylic polymer is easily dissolved, which may be more advantageous for improving the performance and lifetime characteristics of the battery.

DESCRIPTION OF DRAWINGS

The FIGURE is an electrochemical impedance spectroscopy (EIS) graph measured for the coin cells prepared in Example 1 and Comparative Example 1, respectively.

BEST MODE

Hereinafter, the present invention will be described in more detail in order to facilitate understanding of the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Lithium Electrode

The present invention relates to a lithium electrode comprising a lithium metal layer; and an acrylic polymer layer formed on at least one surface of the lithium metal layer. Specifically, the lithium electrode may comprise a current collector; a lithium metal layer formed on at least one surface of the current collector; and an acrylic polymer layer formed on at least one surface of the lithium metal layer.

In the present invention, the acrylic polymer layer functions as a protective layer that protects the lithium metal layer from moisture or external air. In addition, the acrylic polymer layer may serve as a release layer when removing the substrate contained in the acrylic release film used in the method of manufacturing the lithium electrode as described below.

The acrylic polymer layer may comprise an acrylic polymer and an acidic releasing agent, and may comprise 99.9 to 99.99% by weight of the acrylic polymer and 0.01 to 0.1% by weight of the acidic releasing agent.

Also, in the present invention, the acrylic polymer contained in the acrylic polymer layer may be a polymer comprising at least one repeating unit selected from the group consisting of an acrylate-based repeating unit and a methacrylate-based repeating unit.

In this case, the methacrylate-based repeating unit may be a methacrylate repeating unit having an aromatic ring, and the methacrylate repeating unit having an aromatic ring may be, for example, repeating units derived from methacrylate including an aromatic ring having 6 to 12 carbon atoms, and specifically, may be phenyl methacrylate, benzyl methacrylate, or the like.

In addition, the acrylic polymer may further comprise at least one repeating unit selected from the group consisting of an aromatic vinyl-based repeating unit; an imide-based repeating unit; a vinyl cyanide-based repeating unit; and a 3 to 6 membered heterocyclic repeating unit substituted with at least one carbonyl group, in order to improve heat resistance.

The aromatic vinyl-based repeating unit may be a residue of an aromatic compound containing a vinyl group. The aromatic compound containing the vinyl group refers to a compound containing an aromatic group or a functional group inside the compound and having at least one vinyl group introduced.

Specific examples of the imide-based repeating unit may be repeating units derived from maleimide, and for example, may be a repeating unit derived from maleimide substituted with an alkyl group having 1 to 10 carbon atoms or maleimide substituted with an aryl group having 6 to 12 carbon atoms, and specifically, may be a repeating unit derived from cyclohexyl maleimide, phenyl maleimide and the like. The content of the imide-based repeating unit may be about 1 to 30 parts by weight, preferably about 5 to 20 parts by weight, and more preferably about 8 to 15 parts by weight based on 100 parts by weight of the copolymer resin.

In addition, the vinyl cyanide-based repeating unit may be, for example, repeating units derived from acrylonitrile.

In addition, a specific example of the 3 to 6 membered heterocyclic repeating unit substituted with at least one carbonyl group may be a lactone ring unit.

For example, the acrylic polymer may include at least one selected from the group consisting of polymethylmethacrylate, poly(methylmethacrylate-ethylacrylate), and poly(methylmethacrylate-methacrylic acid), and preferably, the acrylic polymer may be polymethylmethacrylate.

The content of the acrylic polymer contained in the acrylic polymer layer may be 99.9 to 99.99% by weight, preferably 99.92 to 99.98% by weight, and more preferably 99.94 to 99.96% by weight. If the content is less than the above range, the protective function for lithium metal may be lowered. If the content is higher than the above range, the content of the acidic releasing agent may be relatively decreased, and thus the function as a release layer in the manufacturing process may be deteriorated.

Also, in the present invention, the acid releasing agent contained in the acrylic polymer layer means an acid-based releasing agent.

Specifically, the acid releasing agent may be at least one selected from the group consisting of fatty acid, stearic acid, palmitic acid, and oleic acid, and preferably, may be fatty acid.

The content of the acidic releasing agent contained in the acrylic polymer layer may be 0.01 to 0.1% by weight, preferably 0.03 to 0.09% by weight, more preferably 0.05 to 0.08% by weight. If the content is less than the above range, the releasing function may be degraded when the substrate included in the acrylic release film is removed after the transfer process in the method for manufacturing the lithium electrode as described below. If the content is more than the above range, the content of the acrylic polymer may be relatively decreased, and thus the function as a protective layer for lithium metal may be deteriorated.

Also, in the present invention, the thickness of the acrylic polymer layer may be 0.05 to 3 μm, preferably 0.08 to 2 μm, more preferably 0.1 to 1 μm. If the thickness of the acrylic polymer layer is less than the above range, the function of protecting the lithium metal layer from moisture or external air is deteriorated, so that the lithium metal layer may be damaged or the growth of lithium dendrite may not be prevented. If the thickness of the acrylic polymer layer is greater than the above range, the electrode may be thickened, which may be disadvantageous to commercialization.

As described above, the acrylic polymer layer comprised in the lithium electrode according to the present invention may serve as a release layer, when removing the substrate included in the acrylic release film used in the manufacturing method of the lithium electrode, along with a function as a protective layer for lithium metal.

In addition, the acrylic polymer layer is composed of only C, H, and O, and thus is excellent in stability because it does not react with lithium metal.

Also, in the case of the protective layer for the lithium metal comprised in the conventional lithium electrode, there was a problem that the protective layer acts as a resistance during operation of the battery. However, the acrylic polymer layer is dissolved in the electrolyte solution during operation of the battery, and thus cannot be acted as a resistance. In particular, when using a carbonate-based electrolyte solution, the acrylic polymer layer may be easily dissolved away.

In the present invention, the lithium metal layer may be formed on one surface of the current collector. At this time, the acrylic polymer layer may be formed on the entire surface of the lithium metal layer, except for the surface where the lithium metal layer contacts the current collector.

In addition, if the current collector is a porous current collector, the lithium metal layer may be incorporated into the pores in the porous current collector. At this time, the acrylic polymer layer may be provided on the entire surface of the porous current collector except for a terminal connected to the porous current collector and extended to the outside.

The lithium metal layer may have a thickness of 1 μm to 25 μm, preferably 1 μm to 20 μm, and more preferably 5 μm to 15 μm. The thickness of the lithium metal layer may vary depending on the use. If only lithium metal is used as an electrode material, for example, a negative electrode material, the thickness of the lithium metal layer is sufficient if it is at the level of 20 μm to 25 μm. If lithium metal is used as a material to compensate for the irreversibility occurred in the negative electrode of the silicon oxide material, the thickness of the lithium metal layer may be about 5 μm to 15 μm. If the thickness of the lithium metal layer is less than the above range, the performance and lifetime characteristics of the battery may be lowered. If the thickness of the lithium metal layer is greater than the above range, the thickness of the lithium electrode to be manufactured may be thickened, which may be disadvantageous to commercialization.

In the present invention, the current collector may be selected from the group consisting of copper, aluminum, nickel, titanium, sintered carbon, and stainless steel.

In addition, if the current collector is a porous current collector comprising pores, the lithium metal layer may be incorporated into the pores in the porous current collector. At this time, the acrylic polymer layer may be provided on the entire surface of the porous current collector except for a terminal connected to the porous current collector and extended to the outside. Also, if pores are contained inside the porous current collector, sufficient performance of the battery may be secured and an inhibitory effect on the formation of lithium dendrite may be obtained.

The method for filling lithium metal in the pores of the porous current collector is not particularly limited and may vary. For example, lithium metal may be filled in the pores by an electroplating method, a melting method, or a thin film manufacturing technique, or lithium particles may be uniformly filled in the pores of the current collector by a paste coating method.

Manufacturing Method of Lithium Electrode

The present invention relates to a method for manufacturing a lithium electrode comprising the steps of (S1) forming a lithium metal layer on an acrylic release film; (S2) transferring the lithium metal layer formed on the acrylic release film to a current collector; and (S3) removing the substrate included in the acrylic release film.

Step (S1)

In step (S1), a lithium metal layer may be formed on an acrylic release film.

In the present invention, the acrylic release film may comprise a substrate; and an acrylic polymer layer formed on at least one surface of the substrate.

The substrate may be those having a feature capable of withstanding process conditions such as high temperature in the step of deposition of lithium metal and preventing a reverse peeling problem that the lithium metal layer is transferred onto the substrate instead of the current collector during the winding process for transferring the deposited lithium metal layer to the current collector.

For example, the substrate may be at least one selected from the group consisting of polyethylene terephthalate (PET), polyimide (PI), poly(methylmethacrylate) (PMMA), cellulose triacetate (TAC), polypropylene (PP), polyethylene (PE), and polycarbonate (PC).

In addition, the thickness of the substrate may be 20 to 50 μm, preferably 25 to 45 μm, more preferably 30 to 40 μm. If the thickness of the substrate is less than the above range, it may be difficult to withstand the conditions such as high temperature in the process for forming the lithium metal layer on the acrylic release film, for example, the process such as deposition. If the thickness of the substrate is greater than the above range, releasability may be lowered.

In addition, the acrylic polymer layer may minimize the formation of a surface oxide layer (native layer) by protecting lithium metal from an external environment such as moisture or external air in a series of processes of manufacturing a lithium electrode.

The composition and physical properties of the acrylic polymer layer are the same as described above.

Step (S2)

In step (S2), the lithium metal layer formed on the acrylic release film may be transferred to the current collector.

The type and physical characteristics of the current collector may use the same current collector as described above.

Step (S3)

In step S3, the substrate comprised in the acrylic release film may be removed.

As described above, the acrylic release film comprises the substrate and the acrylic coating layer formed on at least one surface of the substrate, and after step (S2), the current collector, the lithium metal layer, the acrylic coating layer, and the substrate are present in a stacked state sequentially.

Accordingly, since the acrylic coating layer functions as a release layer, the substrate may be separated, thereby manufacturing a lithium electrode in which the current collector, the lithium metal layer, and the acrylic coating layer are sequentially stacked.

Lithium Secondary Battery

The invention also relates to a lithium secondary battery comprising the lithium electrode as described above.

In the lithium secondary battery, the lithium electrode may be comprised as a negative electrode, and the lithium secondary battery may comprise an electrolyte solution provided between the negative electrode and the positive electrode.

In particular, since the lithium electrode contains the acrylic polymer layer functioning as a protective layer for lithium metal, it may be desirable to apply to a lithium secondary battery using a carbonate-based electrolyte solution so that the acrylic polymer layer does not act as a resistance during operation of the battery.

If the lithium electrode including the acrylic polymer layer is applied to the lithium secondary battery using the carbonate-based electrolyte solution, the acrylic polymer layer is easily dissolved in the carbonate-based electrolyte solution and does not act as a resistance.

The shape of the lithium secondary battery is not limited, and may be, for example, a coin shape, a flat shape, a cylindrical shape, a horn shape, a button shape, a sheet shape, or a laminate shape. In addition, the lithium secondary battery may further comprise a respective tank for storing the positive electrode electrolyte solution and the negative electrode electrolyte solution, and a respective pump for moving each electrolyte solution to the electrode cell, and thus may be manufactured as a flow battery.

The electrolyte solutions may be electrolyte solutions impregnated with the negative electrode and the positive electrode.

The lithium secondary battery may further comprise a separator provided between the negative electrode and the positive electrode. The separator located between the negative electrode and the positive electrode may be any separator without restriction as long as it isolates or insulates the positive and negative electrodes from each other, and allows the transport of ions between the positive and negative electrodes. For example, the separator may be a non-conductive porous membrane or an insulating porous membrane. More specifically, polymer nonwovens such as nonwoven fabric of polypropylene material or nonwoven fabric of polyphenylene sulfide material; or porous films of olefin-based resins such as polyethylene and polypropylene may be exemplified, and it is also possible to use two or more types of these together.

The lithium secondary battery may further comprise a positive electrode electrolyte solution on the positive electrode side and a negative electrode electrolyte solution on the negative electrode side separated by the separator. The positive electrode electrolyte solution and the negative electrode electrolyte solution may include a solvent and an electrolytic salt, respectively. The positive electrode electrolyte solution and the negative electrode electrolyte solution may be the same or different from each other.

The electrolyte solution may be an aqueous electrolyte solution or a non-aqueous electrolyte solution. The aqueous electrolyte solution may contain water as a solvent, and the non-aqueous electrolyte solution may contain a non-aqueous solvent as a solvent.

The nonaqueous solvent may be selected from those generally used in the art and is not particularly limited, and for example, may be selected from the group consisting of a carbonate-based solvent, an ester-based solvent, an ether-based solvent, a ketone-based solvent, an organosulfur-based solvent, an organophosphorous-based solvent, an aprotic solvent, or a combination thereof.

The electrolytic salt refers to those that dissociate into cations and anions in water or non-aqueous organic solvents, and is not particularly limited as long as it can deliver lithium ion in the lithium secondary battery. The electrolytic salt may be selected from those generally used in the art.

The concentration of the electrolytic salt in the electrolyte solution may be 0.1 M or more and 3 M or less. In this case, the charging/discharging characteristics of the lithium secondary battery may be effectively expressed.

The electrolyte solution may be a solid electrolyte solution membrane or a polymer electrolyte solution membrane.

The material of the solid electrolyte solution membrane and the polymer electrolyte solution membrane is not particularly limited, and may be those generally used in the art. For example, the solid electrolyte solution membrane may comprise a composite metal oxide, and the polymer electrolyte solution membrane may be a membrane having a conductive polymer inside the porous substrate.

The positive electrode refers to an electrode that accepts electrons and reduces lithium-containing ions when the battery is discharging in the lithium secondary battery. On the contrary, when the battery is charged, the positive electrode acts as a negative electrode (oxidation electrode), and the positive electrode active material is oxidized to release electrons and lose lithium-containing ions.

The positive electrode may comprise a positive electrode current collector and a positive electrode active material layer formed on the positive electrode current collector.

In the present specification, the material of the positive electrode active material of the positive electrode active material layer is not particularly limited as long as it is applied to a lithium secondary battery together with the negative electrode to reduce lithium-containing ions during discharging and oxidize lithium-containing ions during charging. The material of the positive electrode active material may be, for example, a composite material based on a transition metal oxide or sulfur (S), and may specifically comprise at least one of $LiCoO_2$, $LiNiO_2$, $LiFePO_4$, $LiMn_2O_4$, $LiNi_xCo_yMnzO_2$ (wherein x+y+z=1), $Li_2FeSiO_4$, $Li_2FePO_4F$, and $Li_2MnO_3$.

In addition, if the positive electrode is a composite material based on sulfur (S), the lithium secondary battery may be a lithium-sulfur battery. The composite material based on sulfur (S) is not particularly limited, and a material of a positive electrode commonly used in the art may be selected and applied.

The present specification provides a battery module comprising the lithium secondary battery as a unit cell.

The battery module may be formed by stacking on a bipolar plate provided between two or more lithium secondary batteries according to one embodiment of the present specification.

If the lithium secondary battery is a lithium air battery, the bipolar plate may be porous to supply externally supplied air to a positive electrode comprised in each of the lithium air batteries. The bipolar plate may comprise, for example, porous stainless steel or porous ceramics.

Specifically, the battery module may be used as a power source of an electric vehicle, a hybrid electric vehicle, a plug-in hybrid electric vehicle, or a power storage device.

Hereinafter, in order to facilitate understanding of the present invention, preferred examples are presented, but the following examples are intended to illustrate the present invention only. It will be apparent to those skilled in the art that various changes and modifications may be made within the scope and spirit of the present invention, and also it is obvious that such changes and modifications fall within the scope of the appended claims.

EXAMPLE 1

Lithium was deposited on one surface of an acrylic release film (a product from I-One Film Co., Ltd.) having a length of 20 m by thermal evaporation to form a lithium metal layer having a thickness of 20 μm. At this time, the deposition equipment is EWK-030 equipment from ULVAC company, and the deposition process was performed while the line speed was set to 0.1 m/min, the temperature of the lithium source part was set to 500° C., and the temperature of the main roll was set to −25° C. The acrylic release film (a product from I-One Film Co., Ltd.) has a structure in which an acrylic polymer layer is formed on a PET substrate.

After transferring the lithium metal layer to Cu foil (a product from UACJ company, 20 μm, C100 grade), the substrate comprised in the acrylic release film was removed to prepare a lithium electrode.

The lithium electrode was punched into a circular shape of 14ϕ (size of positive electrode for 2032 coin cell) and 15ϕ (size of negative electrode for 2032 coin cell) sizes, respectively, and Li/Li symmetry cells with a carbonate-based electrolyte solution (EC+EMC(EC:EMC=3:7(v/v))+LiPF$_6$ 1M) were prepared as a 2032 coin cell. At this time, EC is ethylene carbonate, and EMC is ethyl-methyl carbonate.

Comparative Example 1

Lithium was deposited on one surface of Cu foil (a product from UACJ company, 20 μm, C100 grade) by thermal evaporation to form a lithium metal layer having a thickness of 20 μm, and thus prepare a lithium electrode.

In addition, a coin cell was prepared using the lithium electrode in the same manner as in Example 1.

Experimental Example 1

The electrochemical impedance spectroscopy (EIS) of the coin cells prepared in Example 1 and Comparative Example 1, respectively, was measured in Potentiostat (a product from Bio Logic company, VMP-3000) set to a frequency of 10 mHz to 1 MHz.

The FIGURE is an EIS graph measured for the coin cells prepared in Example 1 and Comparative Example 1, respectively.

Referring to The FIGURE, Example 1 which uses the lithium electrode comprising the protective layer for lithium metal and the acrylic polymer layer that functions as a release layer in the manufacturing process of the lithium electrode and Comparative Example 1 which does not comprise a protective layer for lithium metal showed little difference in resistance.

From this, it can be seen that the acrylic polymer layer, which functions as a protective layer for lithium metal in the lithium electrode of Example 1, does not act as a resistance during operation of the battery.

Although the present invention has been described with reference to the limited examples and drawings, it is to be understood by the person skilled in the art that the present invention is not limited thereto and that various modifications and variations are possible within the technical idea of the present invention and the scope equivalent to the claims set forth below.

The invention claimed is:

1. A lithium secondary battery comprising:
    a positive electrode;
    a lithium negative electrode;
    a separator interposed between the positive electrode and the lithium negative electrode; and
    an electrolyte solution;
    wherein the lithium negative electrode comprises:
    a lithium metal layer; and
    an acrylic polymer layer formed on at least one surface of the lithium metal layer,
    wherein the acrylic polymer layer consists of an acrylic polymer and an acid releasing agent,
    wherein the acrylic polymer layer consists of the acrylic polymer in an amount of 99.9% by weight to 99.99% by weight, and the acid releasing agent in an amount of 0.01% by weight to 0.1% by weight, and
    wherein the electrolyte solution is a carbonate-based electrolyte solution.

2. The lithium secondary battery according to claim 1, wherein the acrylic polymer comprises at least one repeating unit selected from the group consisting of an acrylate-based repeating unit and a methacrylate-based repeating unit.

3. The lithium secondary battery according to claim 2, wherein the acrylic polymer further comprises at least one repeating unit selected from the group consisting of an aromatic vinyl-based repeating unit; an imide-based repeating unit; a vinyl cyanide-based repeating unit; and a 3 to 6 membered heterocyclic repeating unit substituted with at least one carbonyl group.

4. The lithium secondary battery according to claim 1, wherein the acid releasing agent comprises at least one selected from the group consisting of fatty acid, stearic acid, palmitic acid, and oleic acid.

5. A method for manufacturing the lithium secondary battery of claim 1 comprising the steps of:
    (S1) forming the lithium metal layer on an acrylic release film, wherein the acrylic release film comprises a substrate layer and the acrylic polymer layer;
    (S2) transferring the lithium metal layer formed on the acrylic release film to a current collector; and
    (S3) removing the substrate layer present in the acrylic release film.

6. The method for manufacturing according to claim 5, wherein the acrylic release film comprises the substrate layer; and the acrylic polymer layer formed on at least one surface of the substrate layer.

7. The method for manufacturing according to claim 5, wherein the substrate layer comprises at least one selected from the group consisting of polyethylene terephthalate (PET), polyimide (PI), poly(methylmethacrylate) (PMMA), cellulose tri-acetate (TAC), polypropylene (PP), polyethylene (PE), and polycarbonate (PC).

8. The method for manufacturing according to claim 5, wherein in step (Si), the lithium metal layer is formed by depositing lithium on the acrylic release film.

* * * * *